Sept. 27, 1938. S. VAN MIERLO ET AL 2,131,202

SIMPLIFIED TELEPRINTER AND SYSTEM

Filed Nov. 23, 1934 3 Sheets-Sheet 1

INVENTORS: S. VAN MIERLO
C. A. J. PULLES
F. E. A. SMETS
L. DEVAUX

BY J. W. Schmied
ATTORNEY

Sept. 27, 1938.  S. VAN MIERLO ET AL  2,131,202
SIMPLIFIED TELEPRINTER AND SYSTEM
Filed Nov. 23, 1934  3 Sheets-Sheet 2
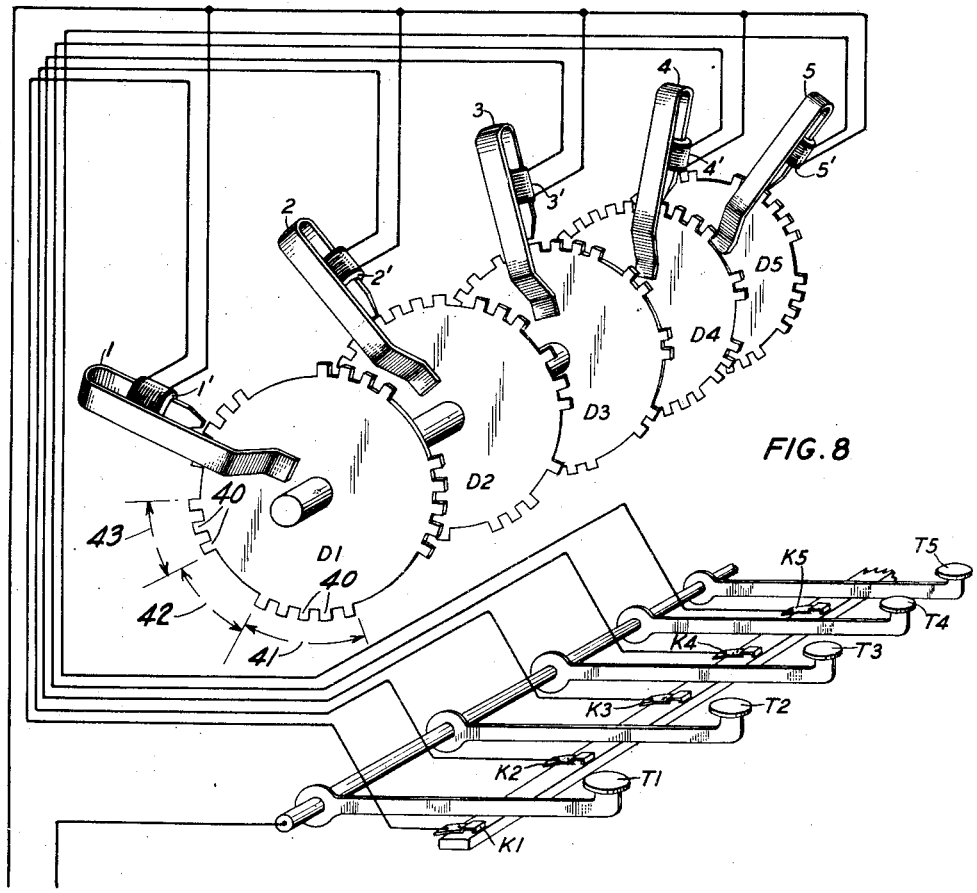
FIG. 8
FIG. 9
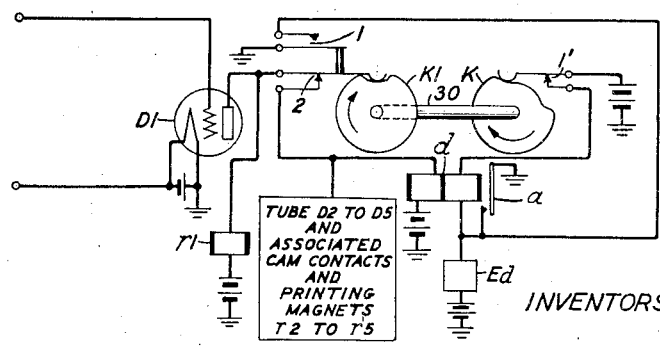
INVENTORS: S. VAN MIERLO
C. A. J. PULLES
F. E. A. SMETS
L. DEVAUX
BY
J. W. Schmidt
ATTORNEY

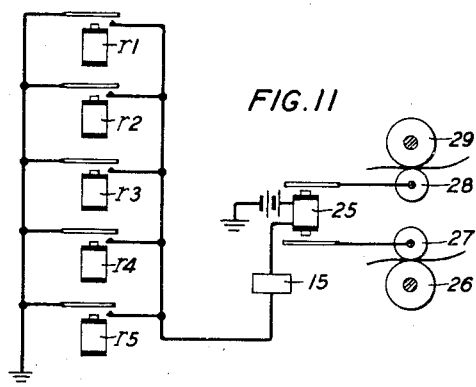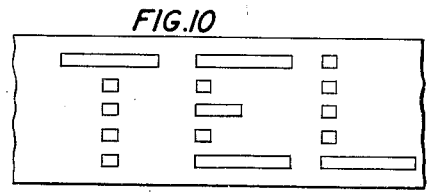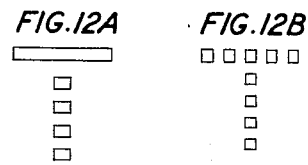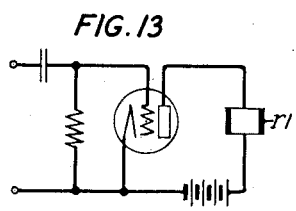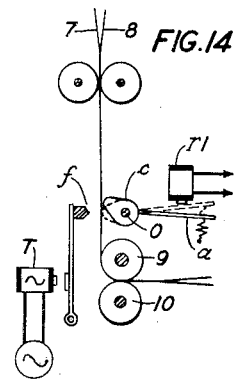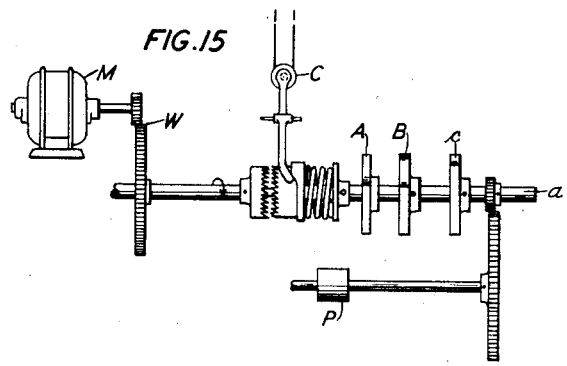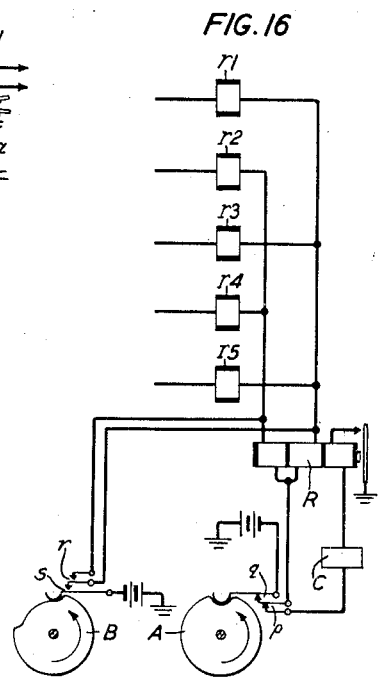

Patented Sept. 27, 1938

2,131,202

UNITED STATES PATENT OFFICE 2,131,202

SIMPLIFIED TELEPRINTER AND SYSTEM

Stanislas Van Mierlo, Cornelis A. J. Pulles, Florent E. A. Smets, and Lucien Devaux, Paris, France, assignors to Western Electric Company, Incorporated, New York, N. Y., a corporation of New York Application November 23, 1934, Serial No. 754,386
In France January 6, 1934

8 Claims. (Cl. 178—5)

The present invention relates to improvements in signaling systems such as teleprinters. The invention concerns more particularly arrangements wherein the message to be transmitted is typed as on a typewriter, at the sending end, and is printed in ordinary characters at the receiving end.

The apparatuses of this kind are generally expensive and not much adapted to operate in the case in which the transmission medium is subjected to disturbances, as this is the case for radio electric transmission, or for transmission along wires subjected to the influence of high current lines.

One of the objects of the present invention is to provide apparatus of simplified construction, and consequently not expensive, and capable of operating on transmission channels subjected to even very important disturbances.

This object, as well as others, which will appear more clearly from a reading of the following description, are attained by utilizing judiciously the available frequency band and/or by applying, in a special way, the message transmission technique.

In a general way, in the case of ordinary teleprinting machines, each letter is transmitted by means of a combination of five signal elements (five-element code): it will be seen therefore that if one of the elements composing the five-element code is mutilated, or if supplementary signals are added by any disturbance, it may happen that the code transmitted is changed by the disturbances during transmission, and that a letter, different from that sent, is printed at the receiving end. This phenomenon takes place particularly in the case of radio links.

Instead of representing the letter by a five-element code which may be altered by the transmission medium to such a point as to render it illegible, or to transform it into a letter different from that sent, the letter to be transmitted may be scanned in a manner analogous to what is done in message or facsimile transmission, and in this case, disturbances occurring during transmission will change only the definition of the sign or letter transmitted, and not its nature.

In the present case, the processes used for transmitting messages may be applied in a particular way, as will be seen later.

According to one of the features of the present invention, each letter or sign to be transmitted is represented by a combination of surface elements of appropriate shape and of electric characteristics, these surface elements being scanned by one or several brushes (or one or several series of brushes), which are adapted to close corresponding electric circuits and to transmit the signals thus produced to a receiver, where they are used for reproducing the signal transmitted.

The signals corresponding to the scanning of a character, letter or sign, may be produced by any suitable means, for example by means of cams, code wheels, etc., adapted either to close or to open directly electrical circuits, or to provoke current variations when the key corresponding to this character is actuated, the signals corresponding to these current variations may be used at the receiving end, as in a facsimile transmission system.

According to another feature of the invention, instead of producing signals corresponding to the scanning of a character, letter or sign, by opening or closing contacts, there are provided means actuated by the depression of the key corresponding to the desired character, said depression producing variations of a magnetic or electrical field adapted to transmit corresponding signals, thus permitting a more rapid transmission of the characters since the signals are no longer generated by mechanical contacts.

According to a feature of the invention, the signals corresponding to a character, letter or sign to be transmitted, are produced by actuating a code wheel constituting the rotor of an electrical generator, this rotor being adapted to make one or several revolutions when the corresponding key is actuated, the current produced by this generator serving directly or indirectly to control the signaling energy.

According to a feature of the invention, a source of carrier frequency is modulated by variations of magnetic fields, corresponding to the different elements of a character, letter or sign to be transmitted.

According to a feature of the invention, a source of carrier frequency is modulated by variations of electrical fields corresponding to the different elements of the character, letter or sign to be transmitted.

According to another feature of the invention, instead of producing amplitude variations of an electrical magnitude corresponding to each signal to be transmitted, or to produce amplitude variations of an electric or magnetic field, use may be made of these variations to cause frequency variations, the signaling being made by frequency modulations. In this case, the arrangements providing variations of electric currents or of magnetic or electric fields, would be associated with oscillators, preferably electronic oscillators in order to control their frequency.

According to another feature of the invention, the signals corresponding to the scanning of a character, letter or sign, may be transmitted either successively, one by one (series scanning) or simultaneously in groups (parallel scanning).

According to another feature of the invention, a system of the above mentioned type is provided with a signal printing receiver, comprising a small number of mobile type bars actuated individually by the received signals, so as to provoke a contact with sufficient pressure between the printing points of the said bars and a printing tape; the movement of these bars being combined with movements of the paper, and the arrangement being disposed so as to simplify considerably the equipment reproducing the characters, letters or signs received.

According to another feature of the invention, the received signals serve only to put in action or control a device for printing of the signals. Devices of this type are sometimes called servo-motors or servo-mechanisms, see the article "Theory of Servo-mechanisms" by H. L. Hazen in the Journal of the Franklin Institute for September 1934, vol. 218, No. 3, pp. 279 to 331.

Other equally important features of the invention will appear more clearly from a reading of the following description based on the accompanying drawings wherein:

Fig. 8 represents a teleprinter signal transmitter in which the signals are produced by variations of magnetic fields;

Fig. 9 represents an arrangement for actuating the tape on which the characters received are reproduced;

Fig. 10 shows one form of tape that may be employed to transmit signals instead of cams or drums;

Fig. 11 shows one method of controlling the recording tapes;

Figs. 12A and 12B show slightly different methods of forming the symbols to be transmitted and recorded;

Fig. 13 illustrates a space discharge device connected between the incoming line and filters and a printing magnet. This space discharge device may be either of the high vacuum type or of the gas discharge type;

Fig. 14 shows a modified form of the receiving mechanism shown in Fig. 7;

Figs. 15 and 16 show an arrangement for controlling the printing magnets and the tape upon which the characters are recorded when the system is operated on a start-stop basis.

Figure 1:
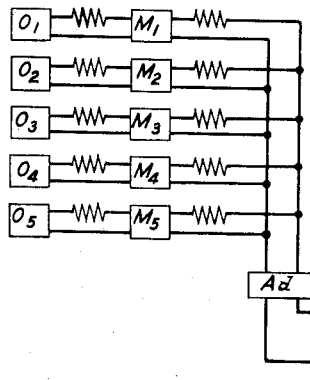
Fig. 1 represents a device to transmit simultaneously several elements of a character or sign scanned.
Figure 1:
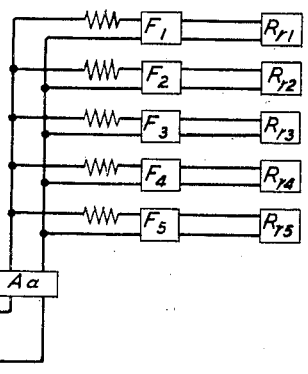

Fig. 1 represents schematically an embodiment of the principle of carrier current systems to the simultaneous transmission of a plurality of constituting elements of a letter or sign to be transmitted. In this figure, $O1$, $O2$, $O3$, $O4$, $O5$, are any sources whatever of constant frequency which may be obtained either from a common generator, or from separated generators. In the circuits of these generators, are located devices $M1$, $M2$, $M3$, $M4$, $M5$, which may be influenced simultaneously by various elements of the character or sign to be transmitted. These devices cause variations in the currents supplied by the constant frequency sources, $O1$, $O2$, $O3$, $O4$, $O5$, in order to produce signals corresponding to the elements of letter or character influencing the modulating devices $M1$, $M2$, $M3$, $M4$, and $M5$. These currents are applied to an output amplifier $Ad$, and therefrom to any transmission channel V.

At the receiving end, the currents received are amplified by an input amplifier $Aa$, and separated by filters $F1$, $F2$, $F3$, $F4$, and $F5$, into frequency bands corresponding to the frequencies of oscillators $O1$, $O2$, $O3$, $O4$, $O5$.

These filtered currents are applied to receiving devices $Rr1$, $Rr2$, $Rr3$, $Rr4$, $Rr5$, adapted to reproduce the elements of the transmitted signals, the same process may be repeated until the scanning of all the elements constituting the signal to be transmitted, has been effected.

Figure 2:
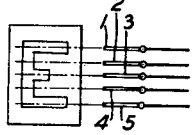
Fig. 2 represents schematically an arrangement for scanning a letter.

Fig. 2 represents schematically a "parallel" scanning device, in which a series of brushes 1, 2, 3, 4, and 5, are adapted to scan all the surface of a character, letter, symbol, or sign to be transmitted.

Numerous arrangements may be used for this purpose, for example, the letter to be transmitted may be formed in relief on a metallic member, the brushes 1, 2, 3, 4, and 5, closing an electrical circuit when they come in contact with the portion in relief of the letter. Combinations of metallic and insulating portions may also be used, the current being closed or open when the brushes come in contact with the letter.

Figure 3:
Figs. 3 and 4 represent a cam or code wheel device producing signals corresponding to the direct scanning of a character.
Figure 4:
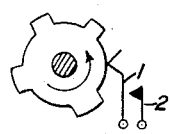

Instead of literally scanning the surface representing materially the letter to be transmitted, there may be provided devices producing electrical variations corresponding to those which would be produced by the direct scanning of the letter, for instance, contact or cam systems, such as those illustrated in Figs. 3 and 4 may be resorted to.

In Fig. 3, the signals are produced by means of an insulating drum provided with contacts $c1$, $c2$, etc., scanned by a brush $b$: these contacts having dimensions computed in order to produce electrical variations corresponding to the direct scanning of the letter to which the said drum corresponds.

An analogous device is shown in Fig. 4, but in this latter case, the contact, instead of being made between a brush $b$ and the contacts $c1$, $c2$, etc., takes place between contacts 1 and 2 actuated by bumps on the cam, which acts then solely for mechanically actuating contacts 1 and 2.

Instead of drums provided with contacts or cams, use may also be made of ribbons, belts, etc., fulfilling the same functions; for example, Fig. 10 shows a portion of a tape in which the characters or symbols to be transmitted are perforated, embossed or otherwise recorded. This ribbon is passed through a sending machine containing a metallic brush for each row of perforations, and which closes a contact each time a brush reaches a perforation. This is thus a kind of tape sending as often applied in telegraph systems.

Figure 5:
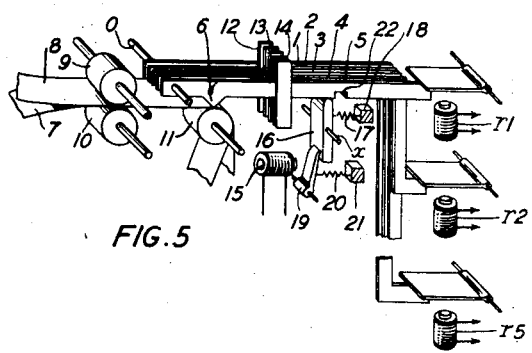
Fig. 5 represents a receiving and printing signal device.

Fig. 5 represents a signal receiving and printing device which may be used, for instance, with the transmission system shown in Fig. 1. This receiver comprises essentially five printing bars 1, 2, 3, 4, 5, controlled by electromagnets $r1$, $r2$, $r3$, $r4$, $r5$ which could be included in the devices $Rr1$ to $Rr5$ shown in Fig. 1. These devices $Rr$, in this case, would comprise a detector, an amplifier, and the actuating system of the printing device, that is to say relays $r1$, $r2$, $r3$, $r4$, $r5$. The printing bars are provided with printing points, such as 6, shown schematically in Fig. 5, but whose preferred shape in profile comprises a right angle, and a slightly rounded portion to avoid tearing of the printing tape. The printing points on the printing bars 1, 2, 3, 4, 5, are adapted, when signals are received, to press against the printing tape 7 which, in the example shown, is covered with a special paper tape 8, known under the name of carbon paper, which moves between rollers 9, 10 and 11 which are actuated by a special mechanism. The printing bars 1, 2, 3, 4, and 5 are kept in position by one or several guides such as 12, 13 and 14.

The "start-stop" principle is used, and the starting and blocking mechanism comprises members 15 to 21. When no signal is received, the member 16 is in the position shown on Fig. 5, and consequently the printing bars which oscillate on the one hand about point O, and bears on the other hand on the upper part of member 16, which is itself rotated about the axis $x$—$x'$, so that the printing bars cannot move. The apparatus is adjusted in order that in this position, the printing points, such as 6, do not bear or bear only lightly on the tapes 7 and 8. In the case of a start-stop mechanism, every letter is preceded by a starting signal causing, for instance, the five magnets $r1$ to $r5$ to operate, for say, during 25 milliseconds. Between this starting signal and the signal for the letter itself, there is a space of, for instance, 20 milliseconds. The printing magnets when operated on the starting signal cause the operation of relay 15, Fig. 11, which may be the same as relay 15 of Fig. 5, and of the clutch 25 for the movement of the paper and the carbon paper. During the time between the end of the starting signal and the beginning of the letter, relay 15 and clutch 25 remain operated, and as there is no pressure on the printing bars, the top of the member 16, Fig. 5, due to spring 17 can move to the right and come under the space 22. In this position of member 16, the printing bars may follow the movements which are imposed to them by the armatures of the electromagnets such as $r1$, $r2$, $r3$, $r4$, $r5$, as soon as the signals representing the letters or signs arise. The electromagnet 15 continues to attract its armature and the member 16 remains in the slot 22, during a time corresponding to the reception of signals by the electromagnets $r1$, $r2$, $r3$, $r4$, $r5$, in order to enable the successive printing of the various points constituting the letter to be received, without necessitating for each point, successive locking and unlocking. This result may be obtained by actuating the electromagnet 15, through the intermediary of a sufficiently sluggish relay, or any other suitable device (dash-pot, clock-words, etc.) capable of attaining the same result.

The amount of delay of this relay may be such that the locking device does not operate between the sending of several successive letters, if the spacing of these letters does not exceed a certain value.

It will be seen later that it may be possible to dispense with the locking devices 15 to 22, represented on Fig. 5. When the letter is over, the five contacts of the printing magnets are opened for a sufficiently long time to cause relay 15 and clutch 25 to release. To obtain different speeds of the paper and the carbon, the rollers 26 and 29 have a different diameter whereas the axial speed of both is the same.

Instead of using carbon paper to produce the impression of the received signals on a tape, use may be made of an inked tape, or any other arrangement capable of producing for instance, by pressure, a mark on the tape used for receiving the printing. It may be interesting, either for economy or for giving a better printing, to give different speeds to the tapes 7 and 8. This may be accomplished by making the feed rollers for the two tapes different sizes and rotating them at the same radial speed or velocity. The printing may be obtained, for example, either by continuous pressure or by shock. Other printing systems could be used in certain cases, for example, the tape may be mechanically perforated or burnt by a spark, or a colored ribbon covered with white wax, for example, may be marked by removing the wax in places either by pressure, shock, scraping or fusion; the fusion of the wax may be obtained by heating the printing points either with hot air sprays or by heat rays controlled by the signals. In another arrangement, the printing may be made by means of a tape sensitive to radiations modulated by the signals or the sensitive layer of the tape may be impressed by pressure, or else, the sensitive layer could have been exposed to radiations and be developed photographically. In this latter case the printing bars would be replaced by conducting brushes through which the alternating or direct currents would flow which would cause, by the above mentioned process, the letters or signs to be formed. The paper may then be simply impregnated with chemical substances which are decomposed by the current, the electrodes intervening or not in the effect to be produced.

A colored paper tape which on one side is covered with a thin layer of white wax so that this side in its virginal state is white may be used. When this paper is drawn under the printing bars and the printing magnets are operated, the wax will be scraped off, supposing the contact points of the printing bars have a convenient form.

Another method to remove the wax is heating; this can be done by heating the printing ends of the printing bars by means of an electrically heated stylus mounted near the printing ends. In this case, the printing members must be normally at a certain distance from the wax paper, and the operation of the printing magnets must cause the printing member to come just into contact with the wax.

It is also possible to blow hot air through small tubes on the wax paper. The printing magnets have then, when they operate, to open valves which cause the hot air to blow through the corresponding tubes upon the wax.

Another possibility is to direct hot rays on the wax paper which are shaded when the printing magnet is in the non-operated position.

To remove the wax by pressure or by shock it is necessary that at the sending end the horizontal bars of the letters are interrupted so that a magnet operates several times for the top of the T, for instance, so that instead of Fig. 12A, Fig. 12B is sent.

The armature of the printing magnet is for this case provided with a flat spring at the end of which a small mass is fixed; thus every operation of the magnet causes a hammering on the printing bars which shocks remove at the printing member the wax on a spot of the paper.

The printing magnet may be used to perforate the usual paper tape. The paper may be moved between one common electrode and several individual ones. The line currents may modulate a local high frequency high tension oscillator, the voltage of which is sufficient to cause a discharge between the individual and the common electrodes. If the current is sufficiently high, a small hole will be burnt in the paper.

In case the tape used is sensitive for some kind of radiation, for instance, of visible light, the radiation is controlled by the incoming signals either by using a fixed source (incandescent lamp, for instance) and a light valve or by modulating the source electrically or magnetically (for instance, crater type neon tube). The paper has then to be developed and fixed.

Another feature of photographic paper can be used, i. e., that such paper gives a mark after developing on places where it has been scratched.

Chemically prepared paper may be used, the chemicals being decomposed by means of an electric current passing through paper from a common electrode to the individual electrodes resting on the paper. The metallic electrodes may be chemically active during this electrolysis or not.

The electromagnets $r1$, $r2$, $r3$, $r4$, $r5$ may be actuated through the intermediary of vacuum tubes, rare gas or mercury vapor tubes, comprising an element heated or not and one or more additional electrodes. The received filtered current may be rectified or not. Figs. 9 and 13 show ways of connecting these tubes to the printing magnets. The electromagnets $r1$, $r2$, $r3$, $r4$, $r5$ may be constituted as a telephone receiver or, as the motor of a loud-speaker, for instance, an electrodynamic device may be used. When a current or a radiation is used for impressing the tape, this current or this radiation may be produced directly by the above-mentioned tubes or through the intermediary of relays or other tubes.

Figure 6:
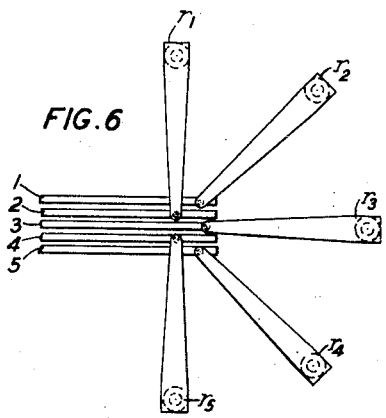
Fig. 6 represents another arrangement of a signal receiver.

Fig. 6 represents an arrangement slightly different from that shown on Fig. 5, in which the electromagnets $r1$, $r2$, $r3$, $r4$, $r5$, instead of being placed one above the other, are placed in the same horizontal plane and adapted to actuate either directly or indirectly, the printing bars 1, 2, 3, 4, 5.

Figure 7:
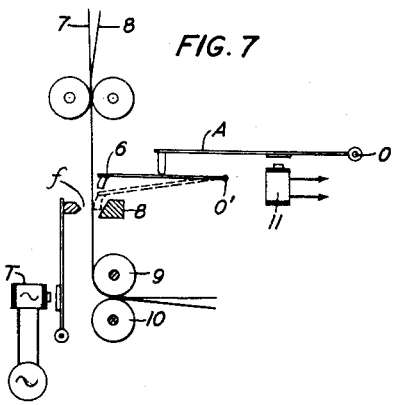
Fig. 7 shows certain components of signal receivers.

When the received signal currents are too small to actuate directly the printing bars such as 1, 2, 3, 4, 5 (Figs. 5 and 6) the arrangement shown in Fig. 7 may be used: this arrangement utilizes the servo-motor principle. In Fig. 7, 11 is a receiving electromagnet analogous to the corresponding electromagnets shown in Figs. 5 and 6. When a signal is received by the electromagnet 11, the latter attracts its armature A which may oscillate about point O, this armature then acts on the stop 6 which is movable about point O' and is guided by member 8. A hammer or vibrator $f$, adapted to vibrate continuously by means of an electromagnet such as T, provides the energy necessary for the impression of a signal. This method is called a servo-motor device as the printing energy is not obtained from the printing magnet 11, but from an outside source, in this case, the electromagnet with vibrating reed. It will be seen that the signal is printed directly on the paper tape 8 by the sheet of carbon paper 7, as long as the movable stop 6 is in the position shown in dotted line, that is to say, as long as the electromagnet 11 keeps its armature A attracted. The hammer $f$ may vibrate constantly during the whole period of reception of signals or may be actuated by the signal starting the receiving device. In the case of Fig. 7, the electromagnet T is fed with alternating current from the mains. It is obvious that other types of vibrators could be used as, for example, a ringer vibrator.

It will be seen, therefore, that the principle of the arrangement shown in Fig. 7 consists in using the signal received to bring a solid member under the surface of the paper, on the opposite face of which a locally actuated vibrating device is constantly vibrating.

Other embodiments than that shown in Fig. 7 can be used, for example, as illustrated in Fig. 14, the electromagnet $r1$ may be used to displace a cam $c$ which, when this electromagnet is energized, brings its bump under the hammer $f$. In the normal position the cam $c$, movable around the axis $o$ is far enough from the tapes not to touch them when the hammer $f$ is operating. When the electromagnet $r1$ attracts the armature $a$, the cam will be moved and the distance between it and the paper reduced to such an extent that the hammer $f$ will press the paper against it and therefore produce a mark.

In the arrangement of Fig. 7, a certain number of members are common to the five printing bars; for instance, the hammer $f$, the vibrator T and the guide 8.

To obtain a uniform printing without necessitating too precise an adjusting of the device, it has been found advantageous to cover the guide 8 and/or the movable stop 6 and/or the hammer $f$ with a substance of suitable elasticity. The elasticity of such substance should satisfy the condition that if one or several of the stops, such as 6, are not rigorously of the same dimensions as the fixed stops, the printing by means of the fixed stops is not hampered or prevented.

Fig. 8 represents elements of a transmitting device utilizing variations of a magnetic field. In this figure, a series of magnetic substance discs, cogged at their periphery, such as $D1$, $D2$, $D3$, $D4$ and $D5$ is provided, these discs being mounted on a common axis. These discs can be adapted to rotate as a whole unit either one revolution or a part of a revolution each time a key is operated or in a continuous manner. In the former case, the rotation of these discs is started by the actuation of a key in any suitable manner (not shown). As an alternative, the discs $D1$, $D2$, $D3$, $D4$ and $D5$ may rotate continuously and the operating of any of these discs can be made effective by lowering of the key corresponding to the said disc. This will cause the associated contacts $K1$, $K2$, $K3$, $K4$ and $K5$ to close the circuit for one revolution of the cams. Details of the mechanism for controlling these contacts have not been fully shown.

Every disc, such as $D1$, belongs to the magnetic circuit of a permanent magnet or of an electromagnet, such as 1, 2, 3, 4, 5 provided with coils $1'$, $2'$, $3'$, $4'$, $5'$. One sees that the rotation of the disc $D1$, for instance, will vary, the reluctance of the air-gap of magnet 1 according to the cogging of the disc and thence will cause current variations in the circuit of coil $1'$ which is closed by the contact $K1$ of the key $T1$ lowered at that moment. As the teeth 40 of the cogging pass the pick-up coil $1'$ they may induce in it carrier current the frequency of which is dependent upon the speed of rotation of disc $D1$ and the width and the spacing of the teeth 40. The width and the spacing of the teeth 40 is termed the cogging gauge. As shown in Fig. 8 groups of varying numbers of cogging teeth 40 are irregularly spaced around the periphery of the disc. Thus there are five teeth shown in the section 41 of the disc, no teeth in the section 42 of the disc, and three teeth shown in the section 43 of the disc. Thus, as disc DI rotates, carrier current is induced in the pick-up coil I' as the section 43 passes it. During the time section 42 is passing the pick-up coil, no carrier current is induced in the pick-up coil. When section 41 is passing the pick-up coil carrier current is again induced therein. Thus, the disc, together with the pick-up coil and its magnetic circuit I including a permanent magnet, serve to generate a modulated carrier current which represents the various symbols or characters to be transmitted. It should be noted that both the width and the spacing of the groups of cogging or teeth 40 remain substantially constant.

The disc may form one of the electrodes of a condenser, the other being a small stationary conductor. When the disc rotates, the capacity of this condenser may be varied in accordance with the cogging and these variations may be used to modulate a carrier frequency. It would be possible, for instance, to connect the above condenser to a source of direct current through a high resistance and use the voltage variations of the stationary electrode to control, by means of a vacuum tube, the carrier frequency.

The device shown in Fig. 8 corresponds to the series scanning. It will be noted that on all discs, the cogging gauge is the same and that on every disc only the number and the manner of grouping the cogs change on the different discs representing the different characters or symbols. One thus produces a carrier frequency determined by the cogging gauge and modulated in accordance with the manner of the grouping of the cogging or teeth which characterizes the sign or letter to be transmitted.

In the case of parallel exploration, every disc is subdivided into a certain number of portions, five, for instance, and with each section of the disc is associated a magnet or electromagnet provided with a signaling coil such as I', Fig. 8. The cogging gauge, in these different sections, will be such that carrier frequencies are produced when the disc will rotate at an angle equal to any of the said sections.

A suitable device, not shown on Fig. 8, can be provided between the keys, such as TI, and the disc impulse senders, such as DI, D2, D3, so that the depression of any key produces the sending of impulses corresponding to said key and that no interference can take place in case several keys are pressed simultaneously.

Fig. 9 represents a device utilized for controlling the movements of the paper. Before each letter a start signal is transmitted. The signals are applied between grid and filament of the detection-amplifying tube DI, and the rectified current corresponds to the start signal which energizes the start relay $d$ by the plate circuit, closed contact 2 of cam KI, left winding of relay $d$, battery and earth.

During reception, the motor at the receiving end turns constantly. A reduction gear causes an axis to turn with such a speed that one revolution is made during the time necessary to send the starting signal and a letter.

When the starting signal comes in, the low resistance relay $d$ which receives the current of the five tubes DI operates, whereas the five printing magnets which have a very high resistance do not receive sufficient current to give an impression on the paper. The operation of $d$ causes via the contact $a$ the operation of the clutch E$d$ which couples with the above mentioned axis a second axis. On the second axis, the cams K and K' are fixed and also the reduction gear which causes the movement of the rollers for the paper movement. Cam KI leaving its home position opens the circuit for relay $d$ which has, however, a locking circuit via contact $l'$ of cam K'; when this contact opens, relay $d$ releases but the clutch remains operated via the contact $l$ of cam KI.

After one revolution (time necessary to receive a letter) contact $l$ of cam KI opens and the clutch releases. During the revolution, the printing magnets are no longer shunted so that they are able to print the received letter.

Figs. 15 and 16 show still another arrangement for controlling the paper for a start-stop system.

The motor M, Fig. 15, causes the wheel W to rotate with a speed so that W makes one revolution in the time necessary to transmit one letter with its preceding starting signal.

An incoming starting signal causes the operation of relay R, Fig. 16, which in turn operates the clutch C, whereupon the axis $a$, Fig. 15, is coupled with the wheel W.

After one revolution of W, the shaft $a$ is mechanically disengaged from the wheel W so that only after the next starting signal the axis $a$ makes another revolution.

On the axis $a$, Fig. 16, the cams A and B (Figs. 15 and 16) are fixed.

Further, the revolution of axis $a$ causes the paper roller P, Fig. 15, and the carbon paper roller (not shown in the figure) to advance the paper and the carbon paper for a certain distance.

The incoming starting signal passing through some or all of the printing magnets causes the operation of these magnets. However, the printing bars cannot mark the paper as during a certain time they are prevented from coming into contact with the paper by means of cam $c$, Fig. 15, which, during the first part of the revolution causes a lever to lift the printing bars. Details of this mechanism have not been shown.

When the starting signal is over, the cam $c$ is advanced far enough to make the printing bars free.

The starting signal, due to interferences might be shortened, however, when it lasts long enough to operate relay R (Fig. 16); this relay makes a holding circuit for itself and will not release before the clutch C has operated, whereupon the holding circuit is opened via contact $q$.

The opening of the contact $q$ causes the release of the printing magnets and only after a certain lapse of time cam B connects them again via contacts $r$ and $s$ to the battery. At this time, the starting signal is over so that the printing magnets are ready to receive the printing signals. Contact $q$ is opened to prevent the end of the starting signal printing or causing marks on the tape when the printing bars are unlocked.

In this system, the starting signal is sent via three channels to $r1$, $r3$ and $r5$ and one of the windings of relay R.

The reason for this is that the signals are sent over by suppression of the frequency at the sending end.

This suppression of a frequency causes the current to flow through the corresponding magnet at the receiving end.

If the starting signal would be sent via the five channels, the clutch would have to operate at the suppression of the five frequencies which means that also in the case of fading of the five frequencies the clutch would operate. This is prevented by sending the starting signals via three channels and to connect the two other printing magnets via an opposing winding of R to battery.

Relay R is adjusted so that it does not operate on the current via one printing magnet whereas it operates on the current via two or three printing magnets aiding. With this arrangement there is little or no danger that either selective or total fading operates the start-stop arrangement.

In the foregoing are described chiefly systems in which the electrical variations originate from rotation movements but it is clear that other systems could be employed, for instance, electric contacts could be controlled by a certain number of selection bars placed in position upon the depression of one key of a board and closing, in this position, electric contacts transmitting corresponding signals to the said key.

The invention could be applied to embodiments quite different from those given above simply by way of example, non-limitative. For instance, the technique of impulse senders for automatic telephone subscribers' sets can be employed.

What is claimed is:

1. A telegraph transmitter comprising an output circuit, a disc for each symbol to be transmitted thereby, means for rotating said discs, a plurality of uniform cogging teeth arranged in groups irregularly spaced around the periphery of each of said discs, a pick-up coil located adjacent the periphery of each of said discs, a magnetic circuit for each of said pick-up coils including said cogging teeth whereby the modulated carrier current is induced in said pick-up coil in accordance with the groups of cogging teeth upon said discs as said discs rotate, and means for selecting and connecting said pick-up coils to said output circuit in accordance with the symbols to be transmitted.

2. A telegraph transmitter comprising an output circuit, a plurality of discs, magnetic material in each of said discs being uniformly divided into a plurality of uniform sections, teeth of different cogging gauge on each section of each of said discs arranged in groups of unequal length irregularly spaced around the periphery of said sections of said discs, a pick-up coil located adjacent the periphery of each of said sections of each of said discs, and means for selecting the pick-up coils associated with one disc and for connecting them to said output circuit, and additional means for causing said disc to rotate through one section for each character transmitted whereby said transmitter simultaneously transmits a plurality of carrier currents modulated in accordance with the symbol to be transmitted.

3. A telegraph receiver comprising a plurality of signal responsive elements, a plurality of platen members controlled by said elements, a continuously virbrating member, a recording medium and means for moving said recording medium between said vibrating member and said plurality of platens.

4. A telegraph receiving device comprising a plurality of receiving elements, circuits therefor, a plurality of platen members controlled thereby for controlling the recording of received telegraph signal impulses upon a recording medium, additional means for recording said signals upon said medium, means for advancing said medium in response to received telegraph signal impulses and means for normally disabling said receiving elements and additional means for rendering said disabling means ineffective in response to a start signal in more than one of said receiving element circuits.

5. A telegraph receiving device comprising a plurality of receiving members, circuits therefor, a plurality of platen members controlled thereby, a recording medium, a vibrating element, an operative connection between said recording medium, vibrating element and platen members whereby said vibrating member records received signals on said recording medium in accordance with the position of said platen members, means for normally rendering said receiving elements ineffective, and means responsive to a start signal in the circuits of any of said receiving members for rendering said receiving elements effective to receive signals.

6. A telegraph receiver comprising a plurality of signal responsive elements, a plurality of platen members controlled by said elements, a vibrating member the vibrations of which are substantially constant, recording medium interposed between said platen members and said vibrating member for recording signals received by said signal responsive element.

7. A printing telegraph receiving and recording device comprising a platen member, a member vibrating continuously and independently of the received signal impulses, a recording medium, means for moving said recording medium between said platen member and said vibrating member, a signal impulse receiving device connected to said platen member whereby said platen member moves said recording medium in contact with said continuously vibrating member in accordance with received signal impulses.

8. A facsimile telegraph system comprising a transmitter having a plurality of magnetic discs, slots of varying arcuate length cut in the periphery of said discs in accordance with the signals to be transmitted thereby, a pick-up coil located near the periphery of each of said discs, a magnetic circuit for said pick-up coils which includes said discs, a transmission circuit comprising a plurality of channels, means for selecting and connecting said pick-up coils to said transmission circuit channels and means for transmitting a start signal in at least two of said channels preceding the signal impulses transmitted over said circuit, and a receiving device connected to said transmission circuit having a receiving element connected to each of said channels, a platen member individual to and controlled from each of said receiving devices, a member vibrating independently of said platen member, a recording medium interposed between said vibrating member and said platen member, and means for normally disabling said receiving elements and additional means for rendering said disabling means ineffective in response to start signals in more than one of said channels.

STANISLAS VAN MIERLO.
CORNELIS A. J. PULLES.
FLORENT E. A. SMETS.
LUCIEN DEVAUX.